J. F. ASTLEY.
PIPE WRENCH.
APPLICATION FILED JAN. 5, 1921.

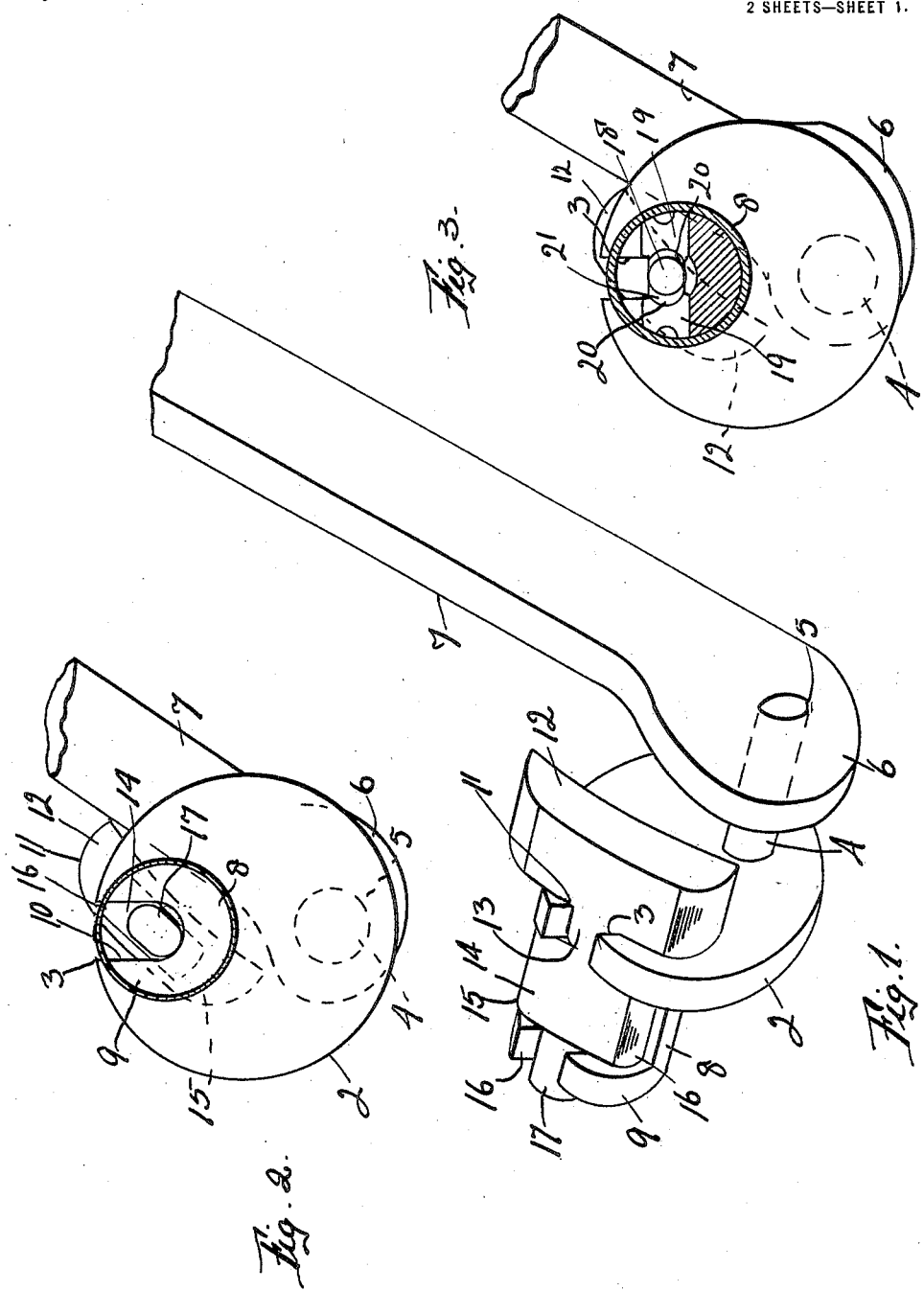

1,400,930.

Patented Dec. 20, 1921.
2 SHEETS—SHEET 2.

INVENTOR,
James F. Astley
By W. W. Williamson, Atty.

UNITED STATES PATENT OFFICE.

JAMES F. ASTLEY, OF CAMDEN, NEW JERSEY.

PIPE-WRENCH.

1,400,930.    Specification of Letters Patent.    Patented Dec. 20, 1921.

Application filed January 5, 1921. Serial No. 435,114.

*To all whom it may concern:*

Be it known that I, JAMES F. ASTLEY, a citizen of the United States, residing at Camden, in the county of Camden and State of New Jersey, have invented new and useful Improvements in a Pipe-Wrench, of which the following is a specification.

My invention relates to new and useful improvements in a pipe wrench, and has for its object to provide an exceedingly simple and effective device of this character which may be readily placed in the end of a pipe, nipple or other similar object and caused to positively grip the same so that it may be revolved in either direction.

Another object of the invention is to provide a device of the character mentioned which will be relatively small and light although strong and durable and which will be inexpensive in the cost of manufacture.

A further object of the invention is to provide a gripping member directly actuated by the operating lever so that a positive gripping action is produced upon the inside of a pipe or other similar object whereby said pipe may be revolved and the exterior surface left unmarred, said wrench also being particularly adapted to use in the removal of broken nipples where it is impossible to place a pipe wrench thereon.

A still further object of the invention is to provide a support in the frame of a disk having a bearing notch and provided with a bracket also having a bearing notch; a gripping member consisting of a gripping dog and an actuating dog further provided with elliptical trunnions mounted in said bearings so that as the gripping member is rotated the gripping dog will be brought into engagement with the inside of a pipe and cause a portion of the bracket to also engage the inside of the pipe and an operating lever provided with means for connection with the supporting disk whereby said lever may be brought into engagement with the actuating dog to rotate the gripping member.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figure 1 is a perspective view of my improved inside pipe wrench the parts being assembled so as when inserted in a pipe a portion of the operating lever will be broken away.

Fig. 2, is an end view of the wrench showing it in operative position within a section of pipe.

Fig. 3, is a view of a slightly modified form of my invention, a part of the bracket being broken away and shown in section.

Figure 4:
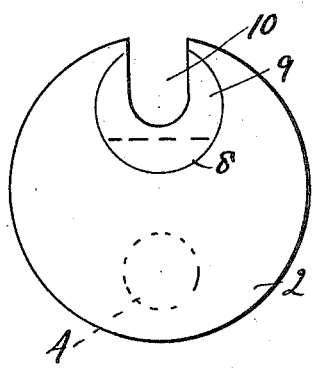
Fig. 4, is an inner end view of the supporting member.
Figure 5:
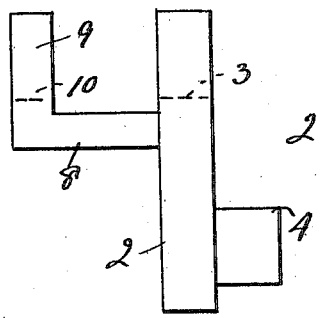
Fig. 5, is a side elevation thereof.
Figure 6:
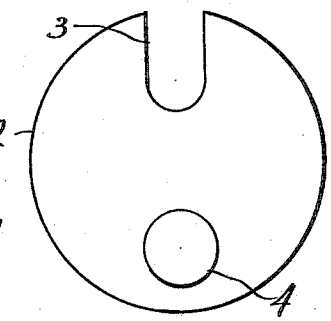
Fig. 6, is a front elevation or outer end view thereof.

In carrying out my invention as here embodied, 2 represents the supporting member preferably in the form of a disk although the configuration may be changed without affecting the operation of the device and this supporting member has an open end bearing slot or notch 3 and is also provided with means for the detachable connection of an operating lever therewith and as here shown these means consists of a pintle 4 formed integral with the supporting member or disk 2 and is adapted to register with a hole 5 formed in the head 6 of the operating lever 7.

It will be obvious that this arrangement of parts may be reversed and the latter formed in the disk while the pintle or stud could be carried by the operating lever.

With the supporting member or disk 2 is formed a bracket 8 projecting in the opposite direction to the pintle or stud 4 and from the face opposite the one from which the stud or pintle projects this bracket includes a foot 9 having an open end bearing slot or notch 10 which is in direct alinement with the bearing slot or notch 3 in the supporting member.

Figure 7:
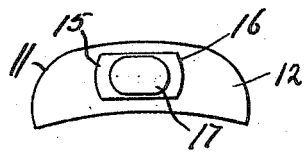
Fig. 7, is an end view of the gripping member.
Figure 8:
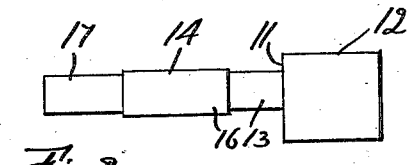
Fig. 8, is a side elevation or edge view thereof.
Figure 9:
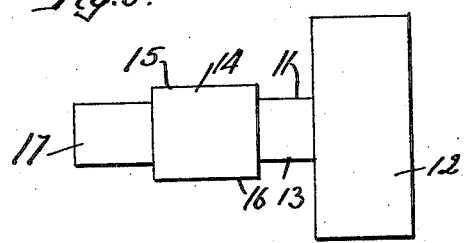
Fig. 9, is a plan view thereof.
Figure 10:
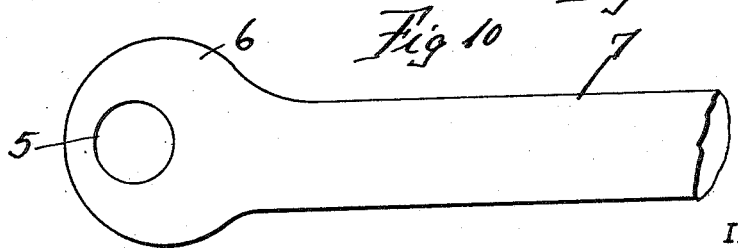
Fig. 10, is a fragmentary plan view of an operating lever.

The reference numeral 11 denotes what I term as the gripping member and consists of a double acting actuating dog 12 with a trunnion 13 projecting from one edge thereof. With this trunnion is also formed the gripping dog 14 having two gripping edges or surfaces 15 and 16 diametrically opposite each other and from this gripping dog projects the trunnion 17. Both of the trunnions are elliptical in cross section as shown in Fig. 7 and the longer axis thereof is parallel with the longitudinal axis or center of the gripping dog.

In operation the foot end of the bracket 8 with the gripping member in place is inserted in the end of a pipe or similar object until the gripping dog 14 is within the same after which the actuating dog is rotated in the proper direction to bring one of the gripping edges or surfaces 15 or 16 in contact with the inner surface of the pipe which action will force the bracket 18 toward the surface of the pipe directly opposite the point engaged by the gripping dog then by bringing the operating lever 7 into proper position, such as is shown in Fig. 2, the gripping dog will be caused to firmly grip the inside of the pipe and since the trunnions are elliptical said dog will be raised or moved to a position eccentric to the center of the pipe which will prevent the wrench from moving relative to the pipe to which it is attached, but when the power of the lever has become sufficiently strong the pipe will be revolved to either screw it into place or out of place according to the direction in which the wrench is operated. Assuming that the wrench as shown in Fig. 2 is in the proper position for screwing a pipe in place then by throwing the operating lever to the other side and rotating the gripping member until the end of the actuating dog shown in raised position is moved to the lowered position then the wrench can be used for screwing a pipe out of place.

In practice the wrench is designed to be used with one size or not more than two sizes of pipe with one gripping member and where the wrench is to be used with another or different sized pipes another gripping member must be substituted having a gripping dog of different length.

In Fig. 3, I have shown a slightly modified form of my invention in which the trunnions 18 are preferably circular in cross section and the gripping means is formed of two blocks 19 identical in construction and each provided at its inner end with an arcuate notch 20 one block being mounted upon each side of the elliptical cam 21 formed between the two trunnions, said blocks when in operable position resting upon the bracket between the foot thereof and the supporting member.

In this form of the invention, the wrench is inserted in the pipe with the longer axis of the elliptical cam at right angles to the longitudinal axis of two blocks 19 so that said blocks will be in a collapsed position then when pressure is brought to bear upon the operating lever the actuating dog will be rotated causing the elliptical cam 21 to be moved in that direction to bring its longer axis toward the longitudinal axis of the blocks 19 which will force said blocks apart and cause them to grip the inner surface of the pipe with sufficient pressure to prevent them from moving or slipping relative to said pipe so that said pipe will be revolved to screw it into place or out of place according to the direction in which the operating lever is moved.

Of course I do not wish to be limited to the exact details of construction as herein shown as these may be varied within the limits of the appended claims without departing from the spirit of my invention.

Having thus fully described my invention, what I claim as new and useful is:—

1. An inside pipe wrench comprising a supporting member, a gripping member and a lever detachably connected to the supporting member and coacting directly with the gripping member to actuate the same.

2. A wrench consisting of a supporting member, a bracket carried thereby, a gripping member journaled in the supporting member and bracket, an operating lever and means for detachably connecting said lever with the supporting member, said lever coacting with the gripping member to actuate the same.

3. In a device of the character stated, a supporting member having a bearing notch therein, a bracket carried by said supporting member and projecting from one face thereof, a foot formed with the bracket, said foot having a bearing notch therein, said last named notch being in alinement with the first mentioned notch, a gripping member journaled in said bearing notches and manually operated means directly coacting with the gripping member to rotate the same.

4. In a device of the character stated, a supporting member having a bearing notch therein, a bracket carried by said supporting member and projecting from one face thereof, a foot formed with the bracket, said foot having a bearing notch therein, said last named notch being in alinement with the first mentioned notch, a gripping member comprising an actuating dog, a trunnion formed therewith and projecting therefrom, a gripping dog formed with the trunnion, another trunnion formed with the gripping dog in endwise alinement with the first named trunnion, said trunnion being elliptical in cross section with the longer axis parallel with the longitudinal axis of the gripping dog, the gripping member being journaled by means of said trunnions in the bearing notches of the supporting and bracket foot and an operating lever detachably journaled on the supporting members and engaging the actuating dog to rotate the gripping member.

5. An inside pipe wrench comprising a supporting member, gripping means demountably and rotatably mounted in said supporting member, an actuating dog forming a part of the gripping means, and a lever detachably connected with the supporting member and adapted to engage the actuating dog for rotating said gripping means.

6. An inside pipe wrench comprising a supporting member, an integral gripping member rotatably mounted in the supporting member and operating means temporarily fulcrumed on the supporting member and adapted to directly engage the gripping member to actuate the same.

7. An inside pipe wrench comprising in combination, a supporting member, a gripping member adapted to be temporarily mounted in said supporting member and a lever adapted to be temporarily fulcrumed on the supporting member and moved into direct engagement with the gripping member for actuating the latter.

In testimony whereof, I have hereunto affixed my signature.

JAMES F. ASTLEY.